(12) United States Patent
Kier et al.

(10) Patent No.: US 9,747,307 B2
(45) Date of Patent: *Aug. 29, 2017

(54) SYSTEMS AND METHODS FOR IMMERSIVE BACKGROUNDS

(71) Applicants: Scott Kier, San Francisco, CA (US); Matthew Kier, Arlington, VA (US); David Kier, Annandale, VA (US)

(72) Inventors: Scott Kier, San Francisco, CA (US); Matthew Kier, Arlington, VA (US); David Kier, Annandale, VA (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/633,137

(22) Filed: Feb. 27, 2015

(65) Prior Publication Data

US 2015/0310041 A1     Oct. 29, 2015

Related U.S. Application Data

(63) Continuation-in-part of application No. 14/082,450, filed on Nov. 18, 2013, now Pat. No. 9,011,246.

(51) Int. Cl.

| | | |
|---|---|---|
| A63F 9/00 | (2006.01) | |
| G06F 17/30 | (2006.01) | |
| G06F 3/048 | (2013.01) | |
| A63F 13/90 | (2014.01) | |
| A63F 13/213 | (2014.01) | |
| A63F 13/214 | (2014.01) | |

(52) U.S. Cl.
CPC ...... *G06F 17/30259* (2013.01); *A63F 13/213* (2014.09); *A63F 13/214* (2014.09); *A63F 13/90* (2014.09); *G06F 3/048* (2013.01)

(58) Field of Classification Search
None
See application file for complete search history.

(56) References Cited

U.S. PATENT DOCUMENTS

| | | | |
|---|---|---|---|
| 3,777,674 A | 12/1973 | Parsons | |
| 7,489,500 B2 * | 2/2009 | Liou | F16M 11/14 248/688 |
| 8,316,298 B2 | 11/2012 | Conti et al. | |
| 8,542,250 B2 | 9/2013 | Baseley et al. | |
| 8,549,440 B2 | 10/2013 | Ganz | |
| 2006/0284031 A1* | 12/2006 | Whalen | A47B 81/061 248/125.8 |
| 2008/0296448 A1* | 12/2008 | Eshita | F16M 11/10 248/176.3 |
| 2013/0290876 A1 | 10/2013 | Anderson et al. | |
| 2013/0296058 A1 | 11/2013 | Leyland et al. | |
| 2013/0303047 A1 | 11/2013 | Albert et al. | |
| 2015/0042795 A1* | 2/2015 | Tsuria | A63F 1/00 348/143 |

* cited by examiner

*Primary Examiner* — Seng H Lim
(74) *Attorney, Agent, or Firm* — Tran & Associates

(57) ABSTRACT

An immersive interactive system includes a platform with specialized panel(s) supporting placement of a static background scene and one or more displays; a play area proximal to the platform; an object recognizer to detect one or more items of interest on or near the play area; one or more sensors to detect one or more user activities on the platform; and a processor coupled to the one or more displays, wherein the processor correlates and serves video and optional audio to the one or more displays based on detected object activities and sensor data.

20 Claims, 12 Drawing Sheets

SYSTEMS AND METHODS FOR IMMERSIVE BACKGROUNDS

This application is a continuation in part of application Ser. No. 14/082,450 filed 2013 Nov. 18, the content of which is incorporated by reference.

BACKGROUND

Many products and inventions have been developed in recent years using "marker-based" technologies for object recognition or other technologies to create entertainment systems under the umbrella of augmented reality or to enhance a video gaming experience. Primarily, these inventions morph or superimpose graphics on an entity or physical object captured via an electro-optical camera collection and then "virtualize" the combined images. The present invention is an system designed to enhance pre-defined image "backgrounds" (immersive landscapes) such as posters or play fields with customized displays that change based on objects recognized by one or more sensors, thereby creating an immersive play environment for physical and imaginative play with real world objects in a manner determined by the actor(s) engaged in play.

Various consumer and commercial products and technologies are available for Augmented Reality tools and toys based on marker-based object recognition in photos or video stream captures, or using technologies such as Near Field Communication (NFC) or Radio Frequency Identification (RFID). Object class recognition (e.g., detecting "cars" or "faces") with "markerless" object recognition is also available.

U.S. Pat. Nos. 8,316,298, 8,542,250 and 8,549,440 as well as offerings from video game makers provide marker-based or motion-based technologies. However conventional systems focus on extending a video game or video stream from and on the sensing device itself, such as a handheld gaming device, tablet or phone, or enhancing the imagery in a video game display.

SUMMARY

In one aspect, systems and methods are disclosed to create and manage an immersive environment for play that is enhanced with audio and/or video. Both generic themes and images or licensed materials are physically combined and managed by object recognition technologies to create the experience.

In another aspect, an immersive interactive system is disclosed that includes a platform with specialized panel(s) supporting placement of one or more static background scenes and one or more displays; a play/engagement area proximal to the platform; an object recognizer to detect one or more items of interest on or near the play/engagement area; one or more sensors to detect one or more user activities on the platform; and a processor coupled to the one or more displays, wherein the processor correlates and serves video and optional audio to the one or more displays based on detected object activities and sensor data.

Implementations of the above system can include one or more of the following. The system provides physical mounting options for one or more display monitors and/or printed materials of various sizes combined with independent sensors or those included in mobile devices such as tablet computers or phones. It thus allows the displays of the system to replicate "cut-out" regions of printed or displayed imagery (commonly referred to as regions of interest or "ROI" in the art) to provide interactive and immersive experiences. The software correlates and serves video and optional audio to one or more displays based on object recognition services and sensor inputs. The system includes a shared data store that goes beyond recognizing object classes (e.g., faces, eyes, dolls) to specific items selected by the users (e.g., Playmobil™ Green Dragon, Red Dragon or more specifically the "Red Dragon with Mounted Knight"), and objects or actors in specific states (e.g., "Red Dragon with Open Mouth" or "Sally Doll with Red Dress"). The software is aware of the user's configuration of display devices(s) and associates specific enhancements to each ROI according to the objects sensed in the play area.

Advantages of the system may include one or more of the following. The system enhances physical play by sensing objects and enhancing an environment created with static images in vertical or horizontal mountings coupled with one or more sensing and display devices and CPUs running the software. The system is designed to complement and enhance the play experience with existing objects, not to replace tactile, cooperative or competitive imaginative engagements such as play.

BRIEF DESCRIPTION OF THE DRAWINGS

The detailed description is described with reference to the accompanying figures. In the figures, the left-most digit(s) of a reference number identifies the FIG. in which the reference number first appears. The use of the same reference numbers in different instances in the description and the figures may indicate similar or identical items.

FIG. 4 shows an exemplary side view of the system, while

FIG. 8 shows an exemplary front view of the system with the physical design for a corner, while

DESCRIPTION

A system that is integrated with markerless recognition software and systems geared for play in the physical world (e.g., to enhance the experience of playing with real toys in a markerless and open fashion) is disclosed. The present invention combines unique physical characteristics and software components to create such an environment.

Figure 1A:
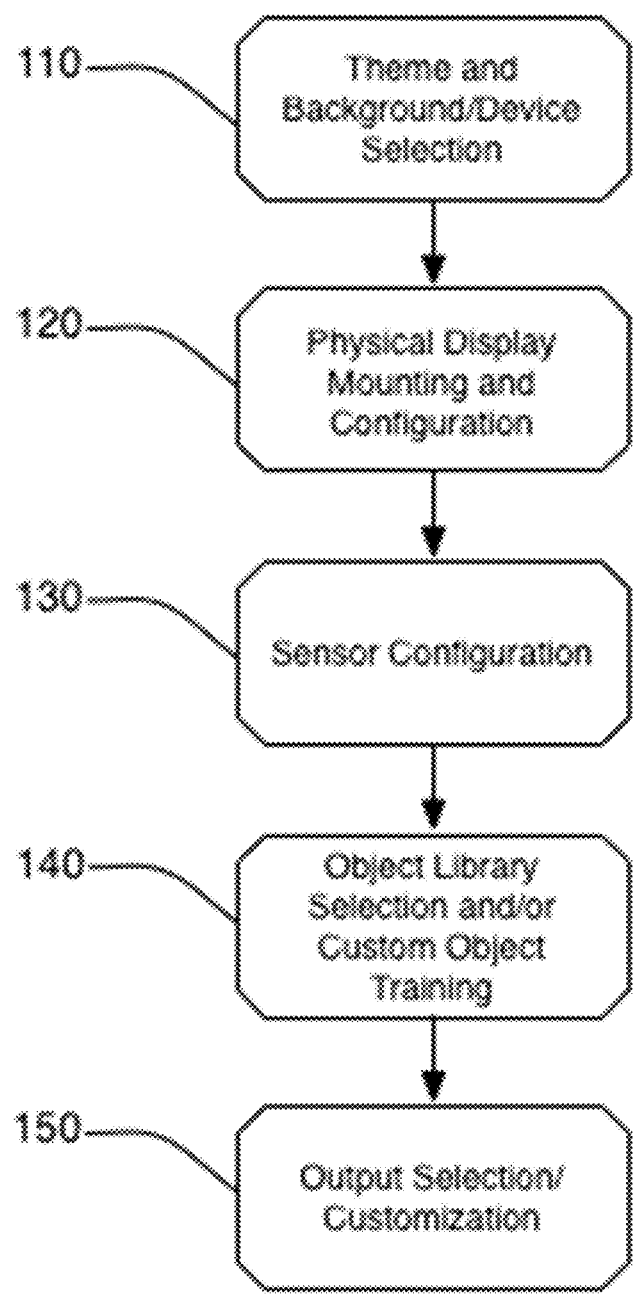
FIG. 1A is an illustration of an example set up process that is operable to provide immersive theme based content interaction techniques.

FIG. 1A is an illustration of an example set up process that is operable to provide theme based content interaction techniques. Once setup/configuration is complete, the invention provides an immersive play environment, presenting a functional and attractive background and/or platform for "360 degree play" with objects in real space. One or more of the system may be combined to provide further immersion or interaction as well: for example, a play mat of a forest floor with embedded displays and a vertical background poster which also has one or more displays, or vertically mounted displays could be configured at varied depths from or angles to the playfield. The system can be packaged with pre-configured software and/or devices for sensing and display, may be customized by the user (licensee or consumer), or both. The core functionality is enabled through a process performed during manufacturing and/or by the end user. FIG. 1A illustrates the key elements of this configuration process.

Turning now to FIG. 1A, block 110 involves the selection or creation of a "theme" for the implementation of the system. A theme could be a generic background for play, such as a forest or mountain scene, a theme specific to a consumer product (or product family) or any other image suitable to the end user's vision for a background/stage for play. Block 120 displays the process of customizing printed media and mounting feature(s) of the system to integrate the desired display(s). In the exemplary implementation, display devices are mounted flush to a printed poster in a position such that the full or partial display device fills a cut-out section of the poster. Block 130 displays the configuration process for one or more sensors used with the system. Many sensor options could be leveraged, such as integrated sensors in a display device (e.g., a tablet or other personal computing device or phone), various single- and multiple-point sensing optical cameras or light-cameras (plenoptic cameras) and other sensors such as infrared (IR) that sense parts of the spectrum outside of human vision capabilities. Configuration may simply include mounting or selection from a list presented by the included software, or may require more technical configuration for calibration of the sensor(s) and software. Block 140 displays the process of selecting or configuring the "Object Library" to be used for object detection. Packaged data stores for common consumer objects will be available for selection (logically these will be packaged with the images used for theme selection). Additionally, end users will be able to "train" the object recognition software to their own objects through the invention. Within this training process, Objects may be defined as specific actors (i.e., an individual person) or embellishments available for play (e.g., clothing for a doll, a weapon for a toy soldier).

Block 150 displays the final configuration decisions for use, which include confirming or selecting the video, images and/or sounds correlated to the objects. Again these will be provided in conjunction with the theme concept, however it is contemplated that end users may want to add or "de-select" specific interactions to meet their needs, and this capability is also provided by the software components of the present invention. This repository is then used by the runtime software to deliver the appropriate experience to the user(s) via one or more display devices.

In the following discussion, an example environment is first described that is operable to employ theme based immersive content interaction techniques. Example procedures are then described which may be employed by the example environment, as well as in other environments.

Figure 1B:
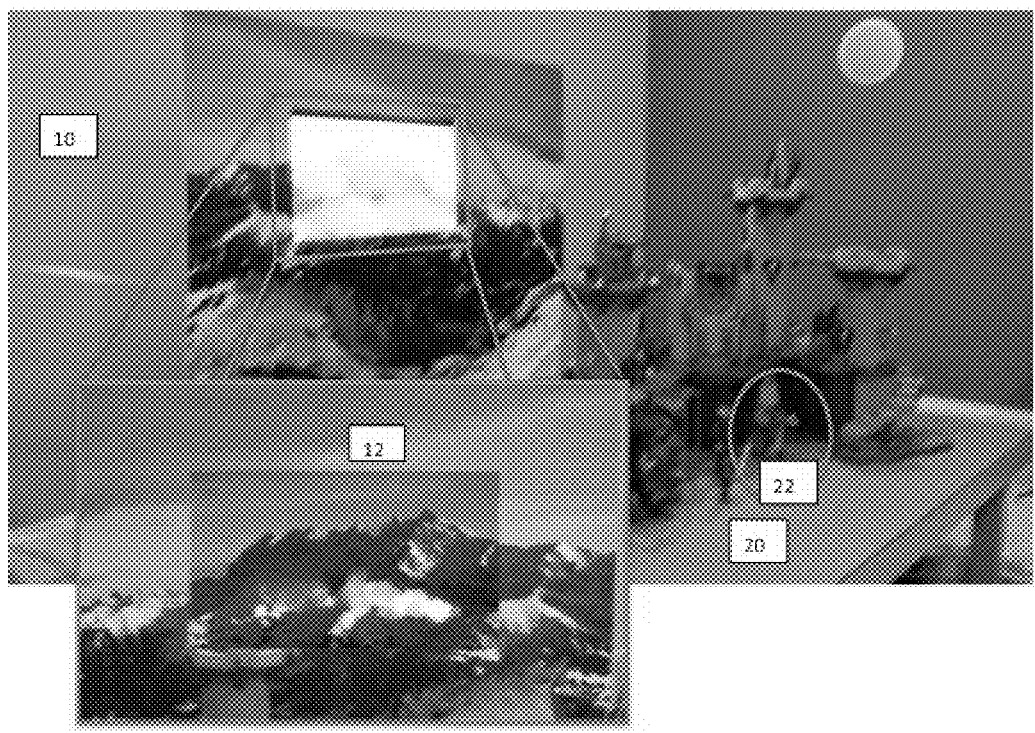
FIG. 1B shows an exemplary physical environment in an example implementation that is operable to provide immersive theme based content interaction techniques.

FIG. 1B shows an exemplary physical environment in an example implementation that is operable to provide immersive theme based content interaction techniques. The example shows a combination of hardware and software that provides enhanced play for children of any age. The immersive experience is based on real-time interaction with the physical world. The system enhances imaginations and extends play time. A background panel 10 is positioned near a playfield 20. The background panel 10 shows a static image that is supplemented with an active display 12 to emphasize actions that may be present in the game. During play, one or more cameras are configured by the system to monitor the play field 20 and capture images for processing actions. Unlike traditional Augmented Reality systems, the display 12 is dynamically changed to enhance the static background imagery. The camera capture is used primarily for object or actor identification, not necessarily for re-display. Image enhancement corresponds to the found objects: in this example, the static mountain is enhanced with a spreading fire and roaring flames associated with a dragon 22 in the foreground.

As shown in the embodiment, the active display 12 can be an HDTV monitor and is brightened for highlight. A safety-ensured table or platform can include specialized panel(s) supporting the placement of various preconfigured or user-provided displays. Further, an integrated structure supports one or more display devices with hidden power and cable management.

A user may select a theme to customize aspects of a user interface used for interactions with a game provider, a service provider, computer, operating system, among others. The play themes are used to customize a set to one or more consumer products, such as toys. Further, the themes can be used by a content provider provide a consistent user experience across interaction that may occur with different hardware and corresponding user interfaces. Techniques are described to provide theme based content interaction. A theme as used herein may be a collection of settings for a user interface that are selected to correspond to a particular topic. A variety of different themes are contemplated, such as themes related to hobbies, family, social groups, work, entertainment, services, people, products, music, and so forth. For example, a theme may be centered around "Sports" or a favorite professional sports team. Another theme may be centered around a user's favorite celebrity. Yet another theme may be centered around a hobby of a user, such as a "Garden" theme. A variety of other examples of themes are also contemplated.

In an implementation, a user interface is provided to enable interaction with a variety of services from a user, a theme developer, or a game or entertainment provider. One or more theme preferences are stored that describe a theme that may be specified by a user through interaction with a game provider. Accordingly, when the user interacts with a particular game provided by the game provider, the game provider may detect a theme associated with the user and output a user interface to include content portions customized to correspond to the detected theme. The theme may be applied consistently across a variety of services and user interfaces that are provided through the service provider. Variable content portions of the user interfaces may be changed to include content that matches a detected theme. Further content portions related to a theme may be added and removed from a user interface based upon a detected theme to provide theme specific functionality. In this way, themes may be defined to customize both visual aspects and content aspects of user interfaces through which a user may interact with a game provider.

Figure 1C:
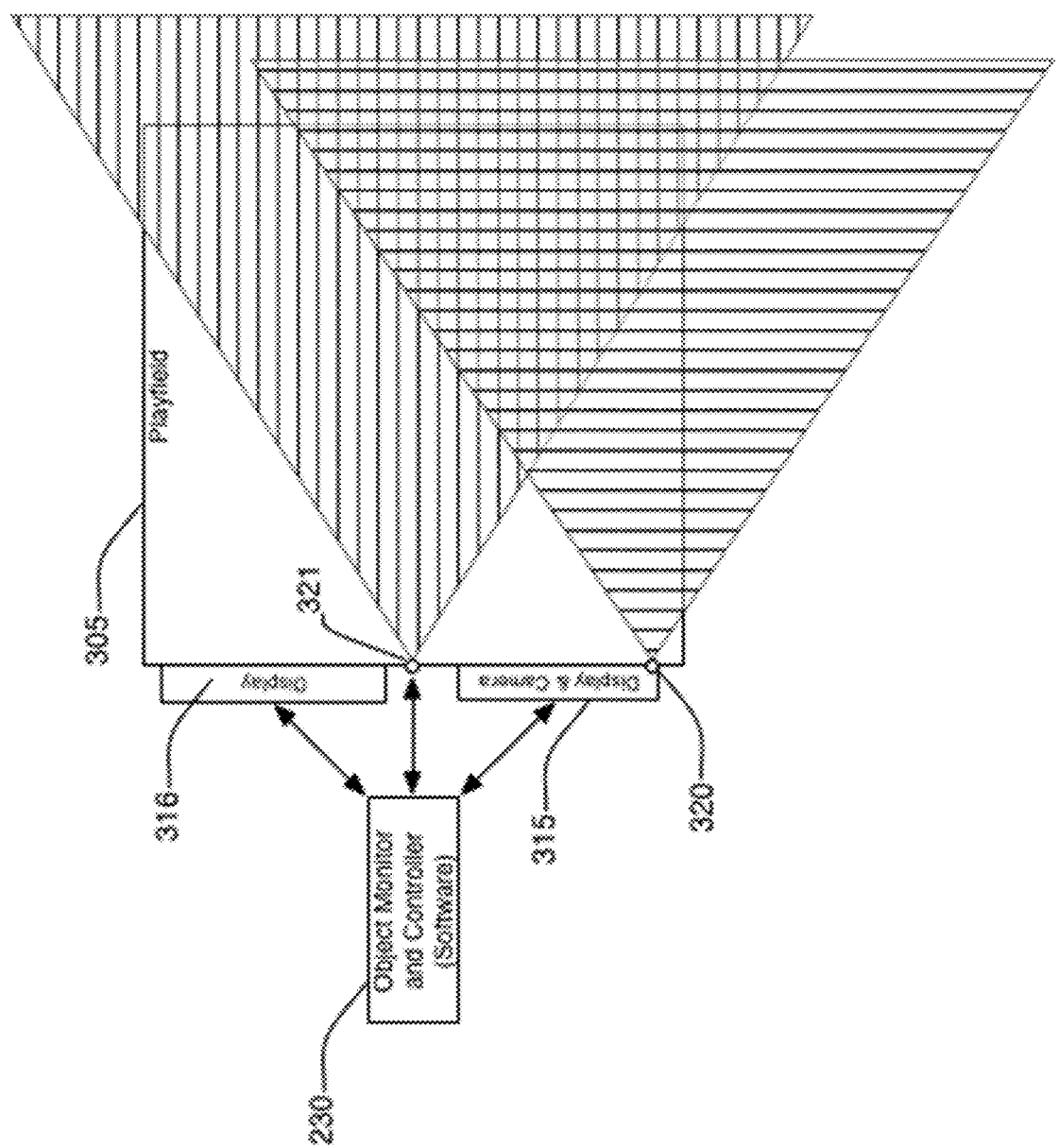
FIG. 1C shows an exemplary top view of the system of FIG. 1B.

FIG. 1C shows an exemplary top view of the system of FIG. 1B. The system may have a plurality of displays 1-X marked as Blocks 315 and 316. The system may have a plurality of sensors such as Markers 320 and 321 that provides a plurality of fields of view over and around a "playfield" marked as 305. An Object Monitor & Controller (230) is implemented as an application that communicates with one or more inputs as well as one or more displays. The display may be part of the host for the application (as in a smartphone or tablet), or may be external to the device hosting the application. In one exemplary objection monitor and controller, the functions and features are as follows:

254 are technically analogous to components 210, 212 and 214 however only contain data relevant to the defined installation/implementation.

A Runtime Controller 260 provides the software dedicated to providing the user experience. Sensor inputs and object recognition are leveraged and managed according the defined configuration(s) of hardware and selected interactions/themes, and are then produced by sending data, signals

| Characteristic | Primary Functions | Features |
|---|---|---|
| Configuration Engine | Load and store internal and customization data<br>Hardware recognition and self-configuration<br>Communication with servers/hosts for updates and liscensing<br>Privacy and DRM (digital rights management) | "Plug and Play" feel for easy home setup<br>Browser-based setup completion<br>Automatic updates from server (if Internet connection present) or via USB storage<br>Data collection and reporting within secure & private layers |
| Computer Vision/Object Recognition Manager | Ability to use pre-loaded libraries as well as "train" to learn new objects<br>Highly self-configurable based on engine settings and real time conditions: frames/samples per second and ROI, for example, based on device/sensor | Packages will be available "off the shelf" for major licenses (e.g., "Malibu Barbie" or "Chuggington")<br>Custom training and recognition is fast and accurate<br>Computer Vision software continues to evolve in the Open Source community |
| Action Manager | Based on settings from the Engine settings and the triggers from the Recognition Manager, this engine selects and excutes the presentation of our immersive features<br>Manage parallel/multiple detections, existing presentations and overall user experience based on configurations that use internal attributes such as priority, sequence and time<br>Populate database and logs of usage statistics | Simple updates/config through XML or other package deliveries from servers of storage media<br>Options for content control (e.g., age-based, login/parental restrictions)<br>Ability to recognize presentation needs based on hardware config (e.g., display size, position, resolution) |

Figure 2:
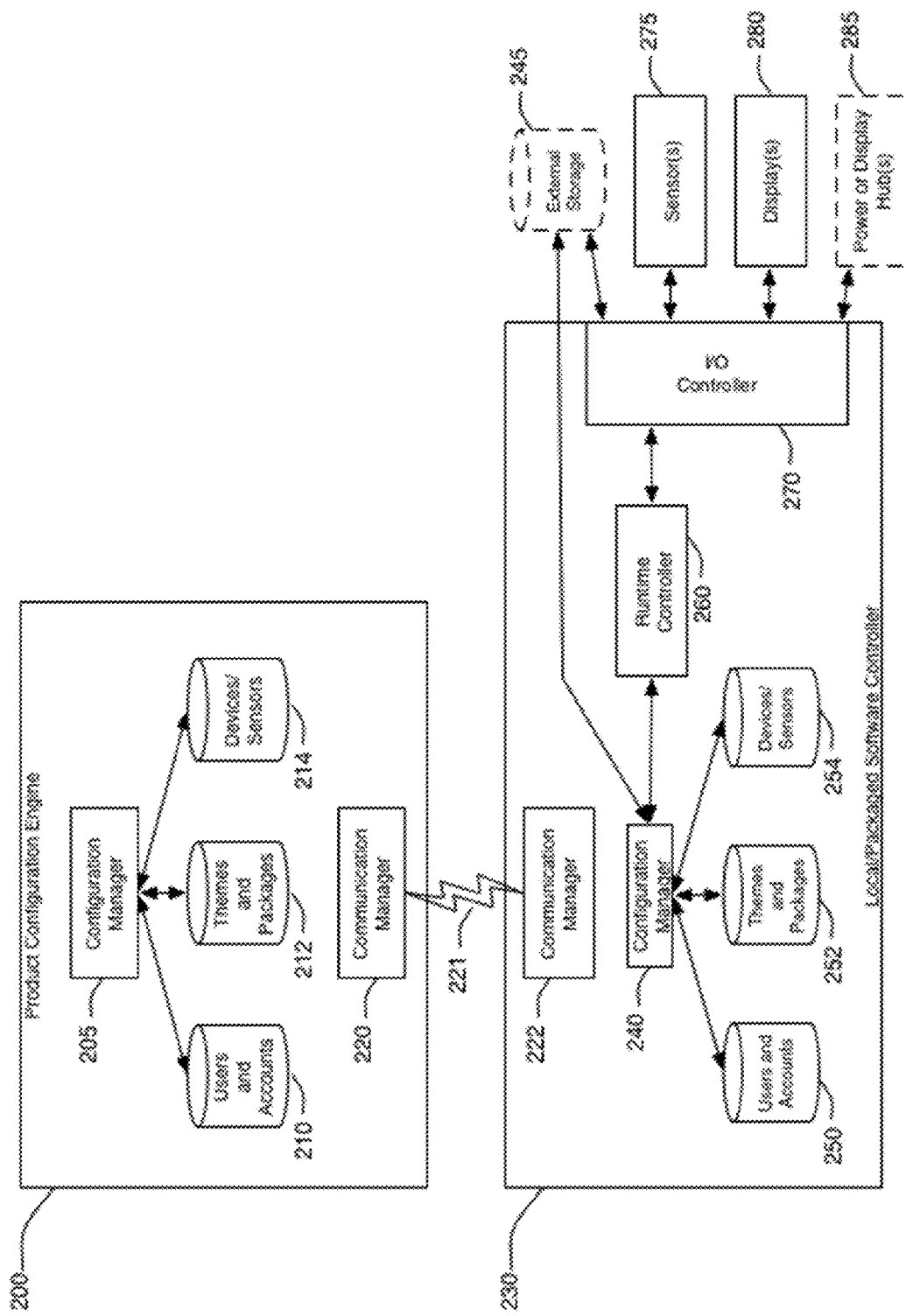
FIG. 2 shows an exemplary software architecture to provide immersive theme based content interaction techniques.

FIG. 2 shows an exemplary software architecture. The architecture uses a central server component 200 to function as the "Product Configuration Engine" over Internet-based or local server networking technologies as displayed at marker 221. The engine 200 communicates with the "local" software components 230 that drive the user interaction with the system. The Controller 230 may be implemented as a software application that runs locally on user-provided hardware or may be implemented as an "appliance" included with the system.

A Configuration Manager 205 manages availability, configuration and distribution of the software by also leveraging commercially available software for network and supporting hardware interfaces displayed as 221. Configurations for user and license management are stored centrally in the data store marked as 210. Configuration details and settings for creating and customizing the user experience are centrally managed and maintained (as themes and customization settings) in data store 212, while required hardware-specific details, including interactions with themes, is managed and maintained in data store 214. Marker 220 represents the communications components for connecting the central server to remote or local installations, using commercially available networking and communications protocols.

A local software system 230 replicates the base architecture for the main server but the content of the data stores applies only to an implementation of one or more systems, as defined by the user(s) and accounts maintained in components 210 and 250. Configurations (initial and ongoing maintenance) are synchronized via the link(s) between 220 and 222, the server-side and local Communications Managers. Alternatively, the local Configuration Manager 240 could be updated using information from local or external storage devices as shown by 245, such as USB storage or other similar devices. The "local" data stores 250, 252 and or other information to be output via the Input/Output (I/O) controller 270, which provides connections to the physical sensors 275 and output devices 280. I/O Controller may also communicate with adapters and devices via wired or wireless technologies as showed in the optional Block 285.

Figure 3:
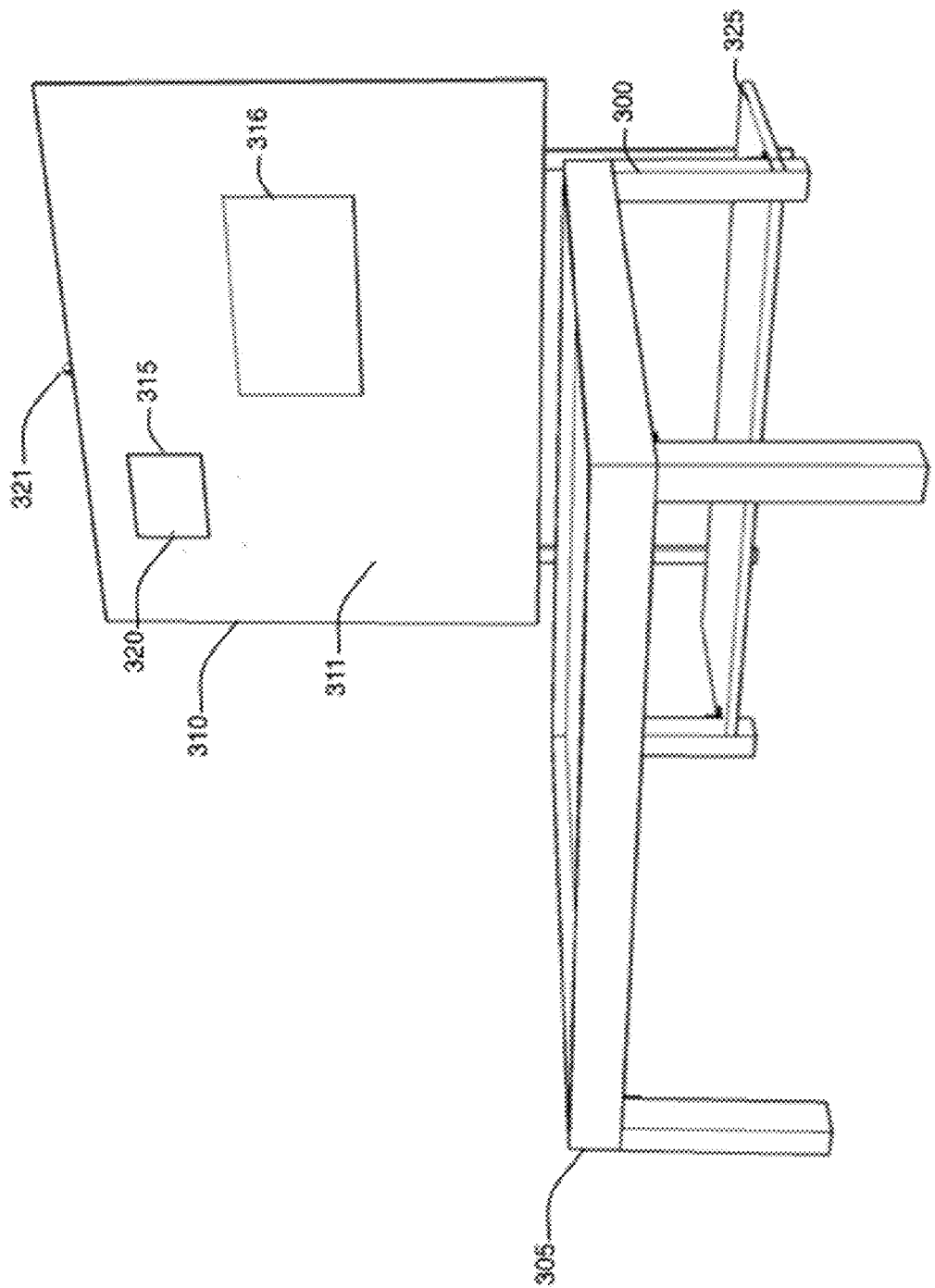
FIG. 3 shows an exemplary front view of the system.
Figure 4:
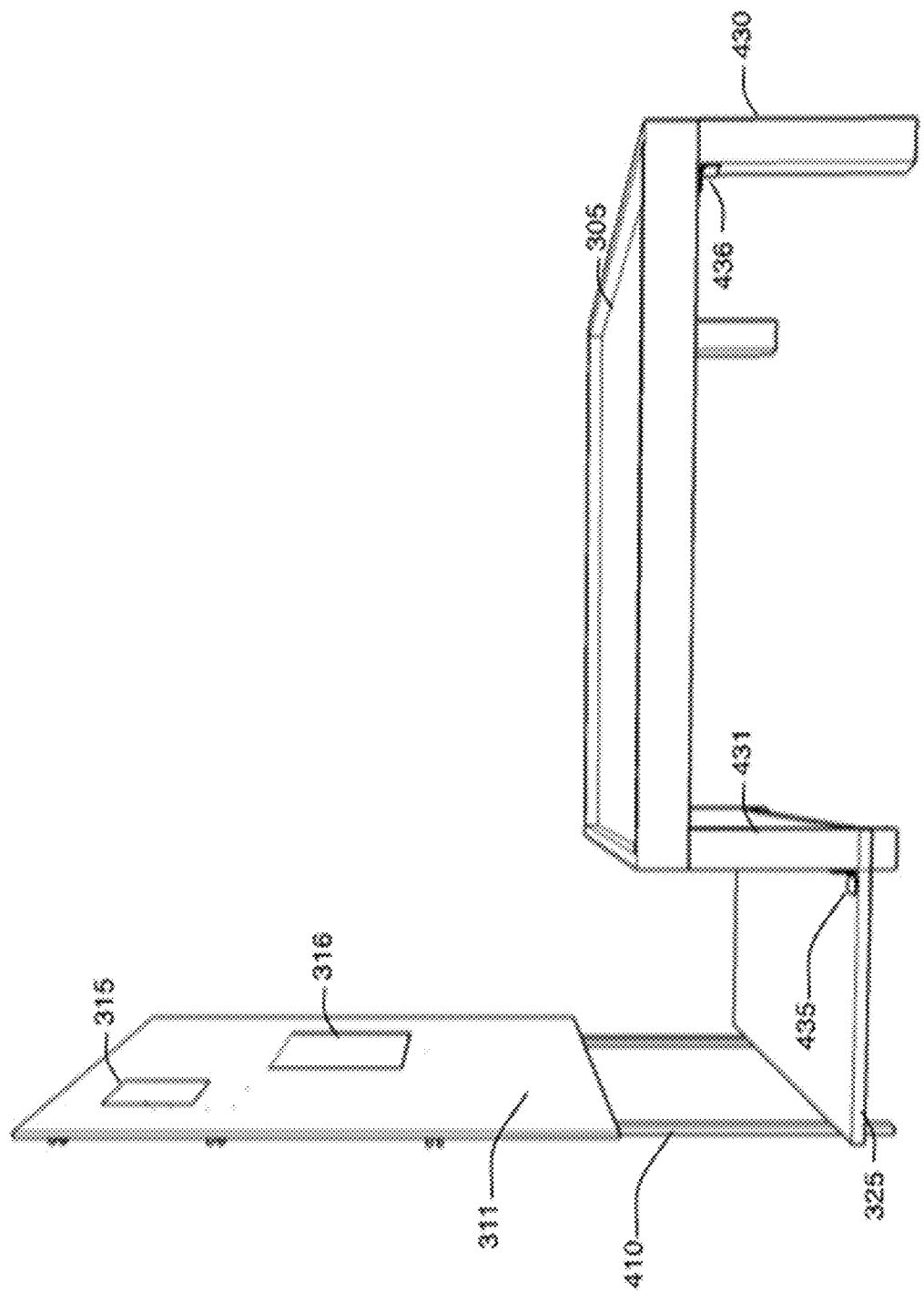
Figure 5:
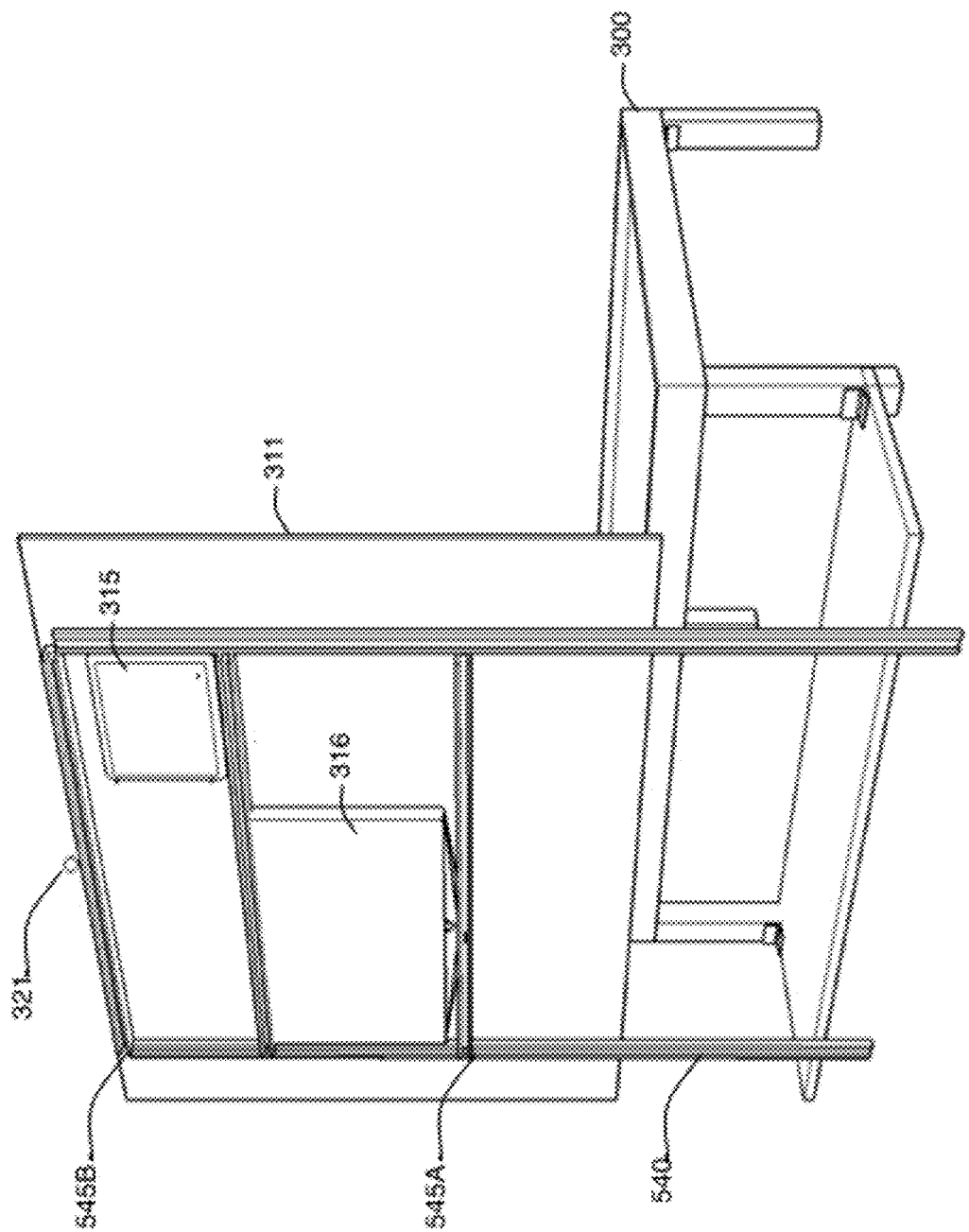
FIG. 5 shows an exemplary rear view of the system.

FIGS. 3-5 shows a schematic diagram of one exemplary physical implementation of the system. Turning now to FIG. 3, an exemplary front view of the system is shown. The base frame of the system is marked as 300 and represents a table-like base connected to an upright structure 310, both of which can support the above referenced displays, with examples shown as 315 and 316 in the vertical position. The vertical structure 310 supports configurable hardware for mounting the displays such that their surfaces are flush to the mounted poster marked as 311. The horizontal structure 305 can support either a tabletop or mounting hardware similar to the vertical frame. Markers 320 and 321 show an in-device sensor and frame-mounted sensor, respectively. From the frontal view, the front edge of the raised shelf-like walkway 325 between the tabletop surface and vertical frame is visible. The optional walkway can provide the "360 degree" access to the horizontal platform and assist with overall stability as well as cable management.

FIG. 4 shows an exemplary side view of the system. Marker 410 displays the vertical frame that includes the mounting hardware for the printed image 311 and the exemplary displays 315 and 316. The mounting hardware allows for any logical configuration, and could also be implemented in the horizontal base frame 305. The horizontal frame is supported by legs 430 and 431 attached to the frame with optional hinges 435 and 436 to provide for portability and easier storage. Marker 325 shows the optional raised walkway that can provide separation between the horizontal and vertical frames and enable hidden cable management.

FIG. 5 shows an exemplary rear view of the system. In the rear view diagram, the frame 300 is shown with attached mounting hardware 540. The mounting hardware is both removable and configurable using sliding and bracing attachments, with examples at 545A and 545B, and allows the attachment of displays 315 and 316 in the manner described above as well as sensors such as 321 and the poster image 311 in the exemplary system. The mounting hardware 540, 545A and 545 also display that the structure provides cable hiding/management features to provide a "clean" and more immersive experience to the end users.

Figure 6:
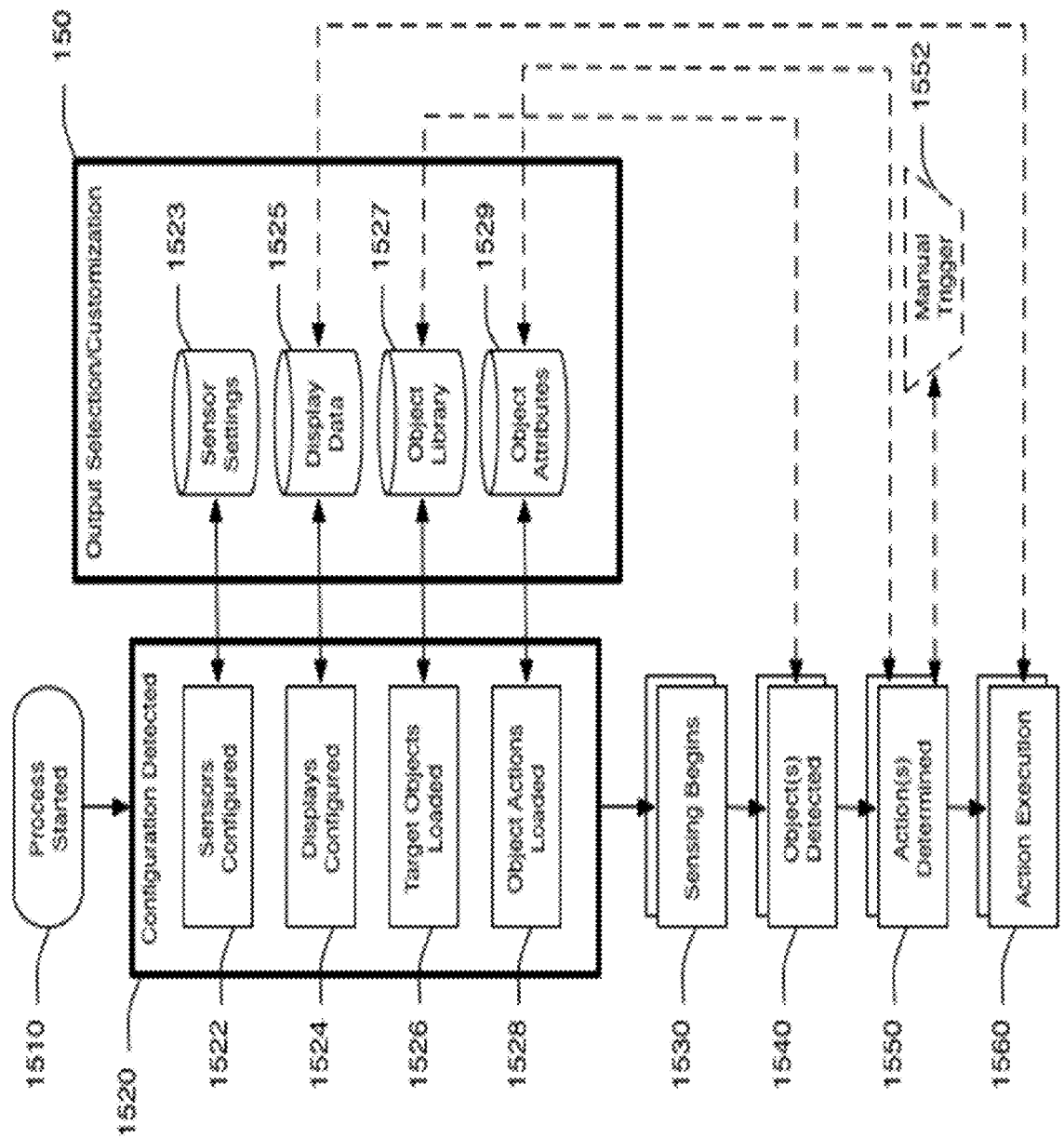
FIGS. 6-7 show an exemplary output selection and customization flow.

Other construction options for the playfield 20 may include one or more of the following:
- Folding table and legs for ease of storage; adjustable table height and image/display distance from table edge
- Choice of materials for reduced cost and weight/portability
- Playset-specific "Playmat" type covers for table surfaces ("Playfield")
- Additional vertical panels for "wrapping around" the play platform
- Proprietary/licensed imagery that is used in tandem with custom "scenes" or animations (with or without sound) to create a more immersive environment FIG. 6 shows an exemplary output selection and customization flow. FIG. 6 displays the execution process of the software in run time, following the configuration process of FIG. 1A, completed with Marker 150. The details of the process begin with 1510, starting of the software services for sensing and display control. 1520 displays the startup phase, which verifies and selects the appropriate software services to be run in memory attached to or supporting one or more CPUs. Sensor configuration 1522 relies on a data store 1523 of all selected/available sensors, and "activates" the sensors for operation during runtime by validating their active connections and settings (for example, a frame sampling rate for a camera sensor). Similarly, 1524 validates configured displays and their configurations to select and load to memory the proper software components and driving settings for the display outputs based on the data store 1525 (e.g., display size and resolution to a large device connected via HDMI cable versus a smaller size tablet connected over a wireless network via a dongle).

Object sensing is configured to specific objects, products or classes in Step 140, and the results provide the inputs to 1526 via the data store 1527, including images and vector data required for markerless sensing commonly known as "positive and negative views" in the art. The final key step in the instantiation of the software is the loading and preparation of the keys to the resulting actions from object detection. Each target object will have one or more audio and/or video options, and these are managed via the process 1528 based on the data store 1529, which contains both links to the series of outputs and the files or data streams themselves.

Module 1530 displays "Sensor Managers"—one or more processes running on the CPU according to the processes of 1520, with one per sensor or sensor configuration (e.g., one process may manage object detection on a camera sensor, and another may manage motion detection from the same sensor feed). Each Sensor Manager leverages information in memory or in the data store 1527 and is able to pass trigger events to 1540, which associate actions to the events based on the information loaded in setup process 1528, or in real-time interaction with the data store 1529. The process marked 1550 manages the ongoing execution of events, including the monitoring of ongoing actions, such as an audio or video stream currently in play. The process manages queues and streams based on attributes passed from the prior processes and current state data. Marker 1551 illustrates that specific actions may also send triggers or requests to the same process via manual selection or input, such as on a control User Interface. Process 1560 uses information in memory or the data store 1525 to function as the Output Controller and executes the instructions passed from 1550 to create the user's experience in real time.

Figure 7:
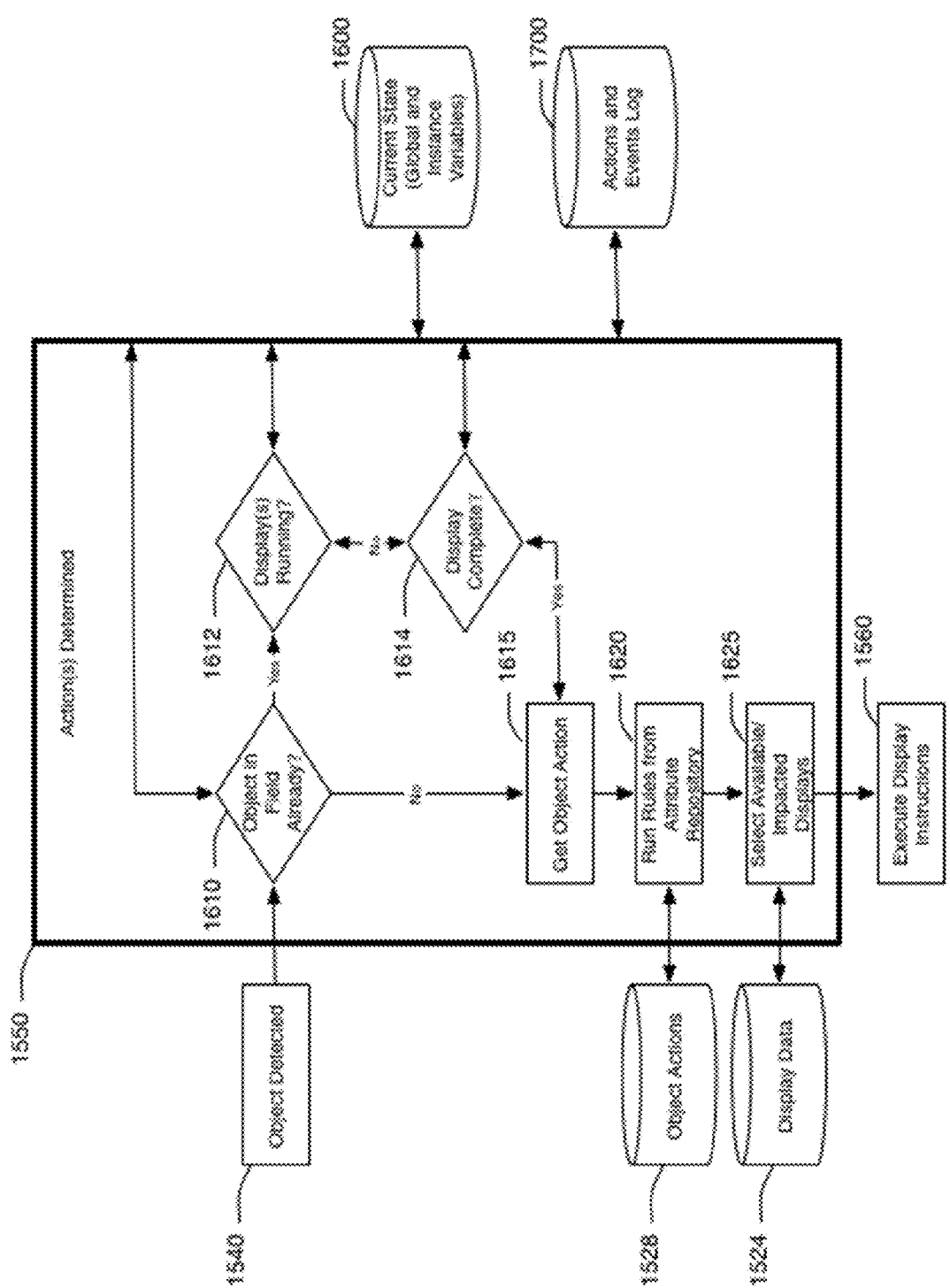

FIG. 7 further expands on the processing engine described in FIG. 6 and shows the operation of marker 1550 and its interaction with related components of the software. 1600 represents the in-memory variables (global and instance data for each process) that are available to the overall decision processing instance 1550 and decision engines 1620 and 1625. In this processing example, Process 1540 detects an object from a sensor, and passes a trigger to the main process, which determines if a prior detection 1610 has resulted in a current display-in-progress 1612. In addition, this process may consider "in progress" to include any lag time settings or other configurations that are designed to manage the user experience. These variables lead to the determination of process 1614 of a "display complete" (including audio) decision that would allow an action to be executed. Marker 1615 receives a request for action and in conjunction with the rules processor 1620, accesses memory and/or the data store 1528 to determine the next appropriate action for the detection event (e.g., "play the third audio/video (A/V) stream configured for Object X, as the prior one displayed for that object 4 minutes ago was A/V Stream 2"). This process also includes access to in-memory variables 1600 and saved logs 1700. The rules engine 1620 then passes instructions to a Display Controller process 1625, which leverages the in-memory information and data store 1524 to prepare and send execution instructions to the Output Controller 1560.

Figure 8:
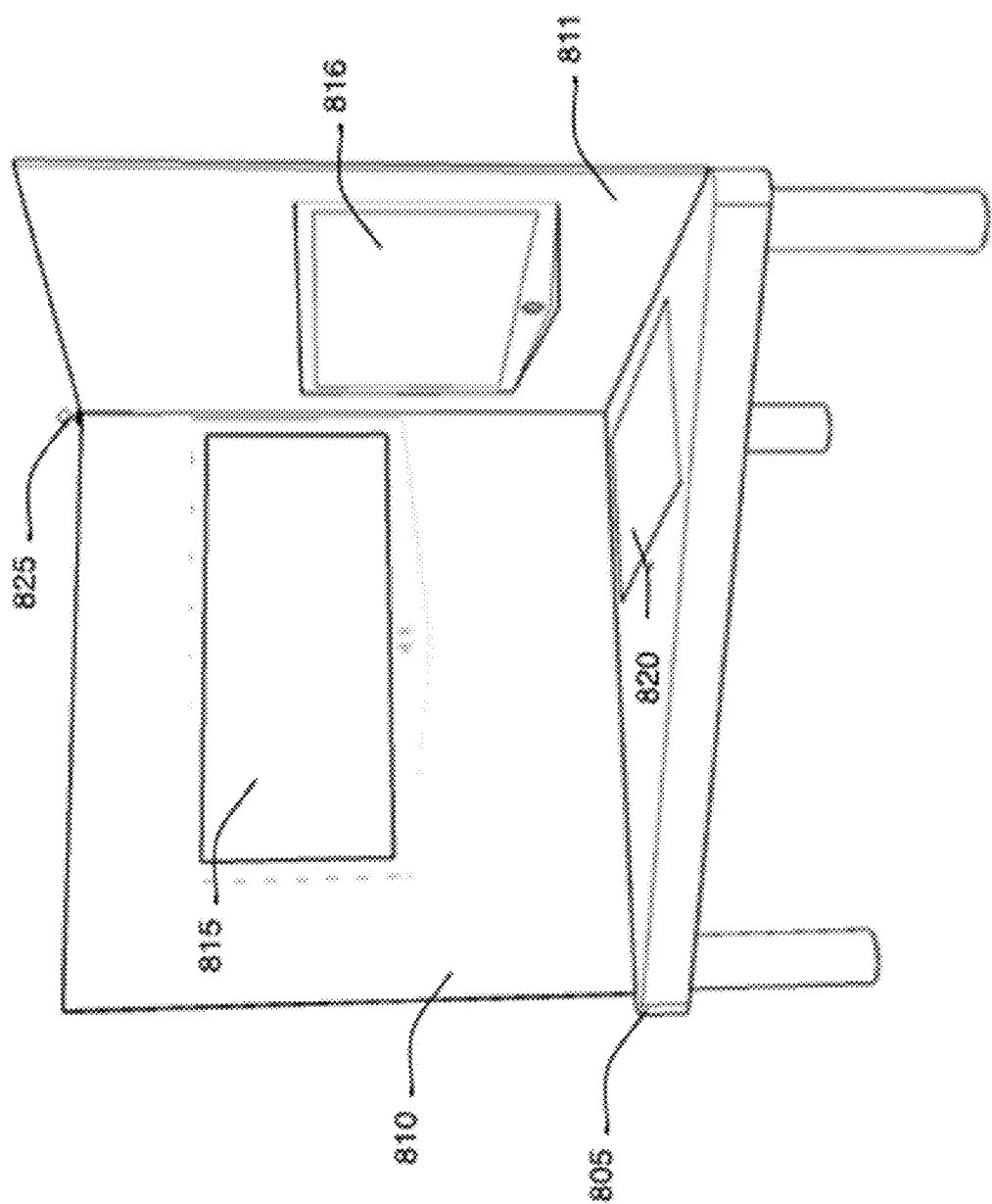
Figure 9:
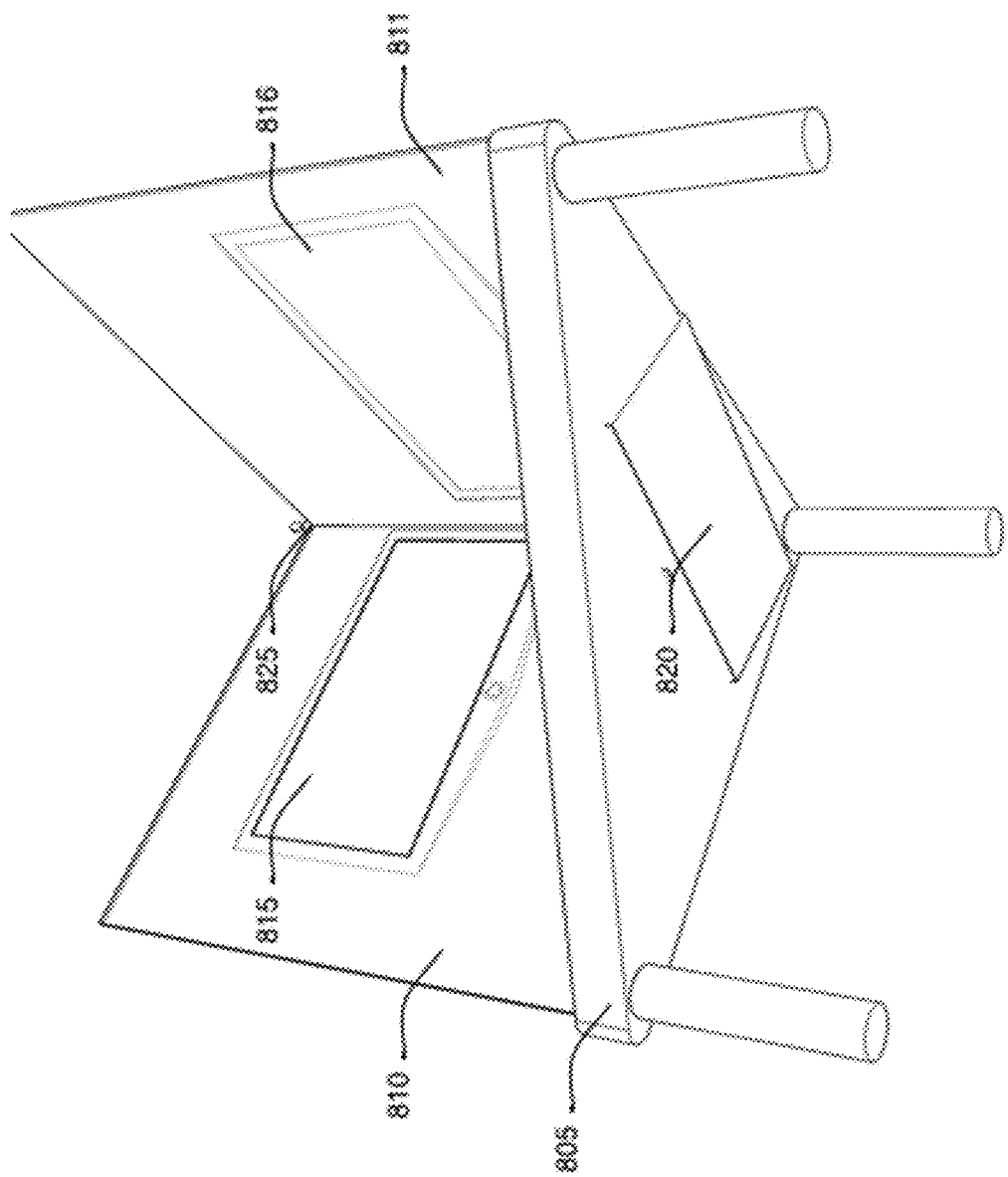
FIG. 9 shows a bottom view displaying a horizontally mounted display.

FIGS. 8&9 display front and bottom view of a second exemplary model. These examples display the horizontal platform 805 configured with multiple vertical displays 810 and 811. The physical structures support vertical displays 815 and 816, in addition to a horizontal display mounted in the horizontal platform/table. This exemplary instance also displays a frame-mounted optical camera sensor at marker 825.

Figure 10:
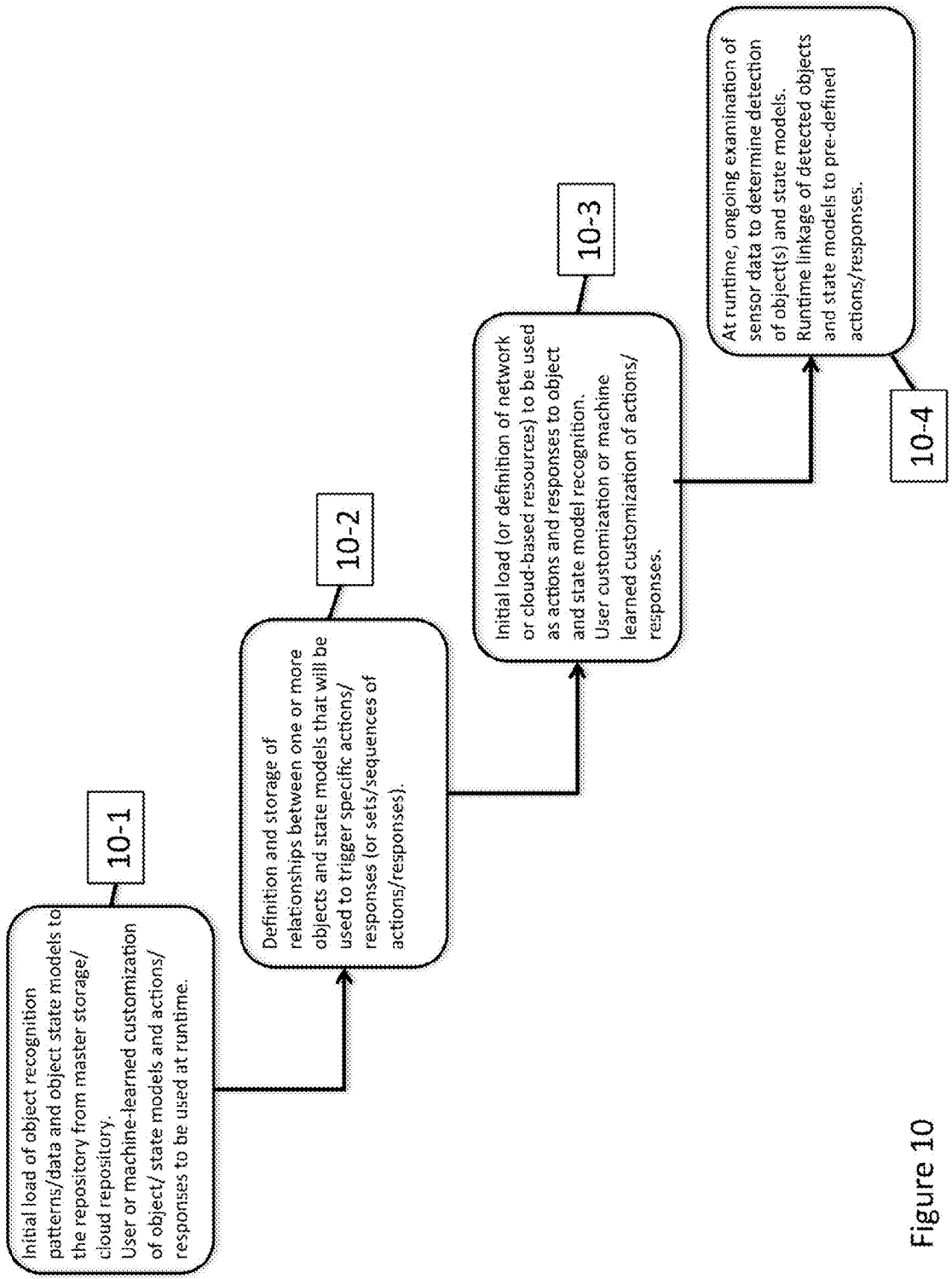
FIG. 10 shows an exemplary process for applying sensor data to link detected objects and state models to predefined actions and responses.

FIG. 10 shows an exemplary process for applying sensor data to link detected objects and state models to predefined actions and responses. In 10-1, the process performs an initial load of object recognition patterns/data and object state models to the local repository from the cloud based/remote master storage repository. The process also determines user or machine-learned customization of object/ state models and actions/responses to be used at runtime.

In 10-2, definition and storage of relationships between one or more objects and state models that will be used to trigger specific actions/responses (or sets/sequences of actions/responses) are processed. In 10-3, the process performs an initial load (or definition of network or cloud-based resources) to be used as actions and responses to object and state model recognition. User customization or machine learned customization of actions/responses is handled at this stage. In 10-4 during runtime, the process examines sensor data to determine detection of object(s) and state models. Next, the process performs live (runtime) linkage of detected objects and state models to pre-defined actions/responses.

While the exemplary model is contemplated for children's toys primarily, the technology platform and physical characteristics of the invention could be transferrable to marketing platforms, educational play or experiences, and other interactive products. Additionally, while aspects of theme based content interaction techniques are described herein in relation to services and user interfaces provided by a service provider, it is contemplated that the techniques may be employed to extend themes to content aspects of user interfaces output in a variety of settings. For example, a theme may be applied to customize content aspects of user interfaces output locally at a computer, such as applying the theme to customize content portions of an operating system user interface of a computer, a desktop gadget output on a computer desktop, a user interface of a desktop application, and so forth. A variety of other examples are also contemplated.

Although the theme based content interaction techniques have been described in language specific to structural features and/or methodological acts, it is to be understood that the appended claims are not necessarily limited to the specific features or acts described. Rather, the specific features and acts are disclosed as example forms of implementing the theme based content interaction techniques.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required".

Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

What is claimed is:

1. An immersive interactive system, comprising:
a platform with specialized panel(s) supporting placement of both a static background scene and one or more computer controlled displays projecting a motion video on the background scene;
a play area proximal to the platform, wherein the background scene is perpendicular to the play area;
an inanimate object recognizer to capture images and detect one or more items of interest on or near the play area wherein the object recognizer identifies one or more features on the inanimate object selected by a user;
one or more sensors to detect the inanimate object on the platform; and
a processor coupled to the one or more displays, wherein the processor correlates and serves video and optional audio to the one or more displays based on detected object activities and sensor data, wherein the motion video is customized to the inanimate object, wherein the object has one or more modes of operation based on inanimate object component movement and wherein the object recognizer detects one of said modes of operation and renders audio or video corresponding to said detected mode of operation.

2. The system of claim 1, wherein the display comprises one or more preconfigured displays or user-provided displays and wherein the one or more displays are dynamically changed to enhance the static background scene.

3. The system of claim 1, wherein the processor displays one or more regions of interest (ROIs) on the one or more displays to provide interactive and immersive experiences.

4. The system of claim 1, wherein the processor receives a user's configuration of the one or more displays and associates predetermined enhancements to each ROI according to one or more objects sensed in the play area.

5. The system of claim 1, wherein the processor renders imagery used in tandem with custom scenes or animations.

6. The system of claim 1, wherein the platform comprises a foldable table.

7. The system of claim 1, wherein the platform comprises a table with adjustable table height and image or display distance from a table edge.

8. The system of claim 1, wherein each panel provides physical mounting options for one or more display monitors, printed backgrounds or play mats of different sizes.

9. The system of claim 1, wherein the panel provides physical mounting options for one or more sensors.

10. The system of claim 1, comprising one or more vertical panels to wrap around the platform.

11. The system of claim 1, comprising one or more playset-specific mats or covers for a table surface.

12. The system of claim 1, wherein the platform comprises an integrated structure to support one or more display devices with hidden power and cable management.

13. An immersive interaction method, comprising:
setting up a platform with specialized panel(s) supporting placement of a static background scene and one or more computer controlled displays and a play area proximal to the platform;
detecting one or more inanimate objects on or near the play area with one or more cameras;
sensing at least one inanimate object on the platform and identifying a predetermined object selected by a user, wherein the object has one or more modes of operation based on inanimate object component movement and wherein the camera detects one of said modes of operation and renders audio or video corresponding to said detected mode of operation; and
correlating and serving video and optional audio to the one or more displays based on detected object activities and sensor data with a processor.

14. The method of claim 13, comprising mounting one or more preconfigured displays or user-provided displays and dynamically updating the one or more displays to enhance the static background scene.

15. The method of claim 13, comprising displaying one or more regions of interest (ROIs) on the one or more displays to provide interactive and immersive experiences.

16. The method of claim 13, comprising associating one or more predetermined enhancements to a region of interest (ROI) according to one or more objects sensed in the play area.

17. An immersive interactive system, comprising:
a platform with specialized panel(s) supporting placement of a static background scene and one or more displays;
a play area proximal to the platform;
an object recognizer to detect one or more items of interest on or near the play area based on captured images;
one or more sensors to detect one or more user activities on the platform; and
a processor coupled to the one or more displays, wherein the processor correlates and serves video or audio to the one or more displays based on detected object activities and sensor data, wherein the object has one or more modes of operation based on inanimate object component movement and wherein the object recognizer detects one of said modes of operation and renders audio or video corresponding to said detected mode of operation.

18. The system of claim 1, wherein the display comprises one or more preconfigured displays or user-provided displays and wherein the one or more displays are dynamically changed to enhance the static background scene, wherein the processor displays one or more regions of interest (ROIs) on the one or more displays to provide interactive and immersive experiences, wherein the processor receives a user's configuration of the one or more displays and associates predetermined enhancements to each ROI according to one or more objects sensed in the play area, wherein an integrated structure to support one or more display devices with hidden power and cable management, wherein the object recognizer identifies a predetermined object selected by a user in a single frame of sensor data, wherein the processor renders licensed imagery used in tandem with custom scenes or animations, wherein the platform comprises a foldable table with adjustable table height and image or display distance from a table edge, wherein each panel provides physical mounting options for one or more sensors and display monitors, printed backgrounds or play mats of different sizes, comprising:
one or more preconfigured displays or user-provided displays and dynamically updating the one or more displays to enhance the static background scene with one or more regions of interest (ROIs) on the one or more displays to provide interactive and immersive experiences, wherein one or more predetermined enhancements are associated with the region of interest (ROI) according to one or more objects sensed in the play area.

19. An immersive interaction method, comprising:
setting up a platform with specialized panel(s) supporting placement of a static background scene and one or more displays and a play area proximal to the platform;
detecting one or more items of interest on or near the play area;
sensing one or more user activities on the platform; and
correlating and serving video and optional audio to the one or more displays based on detected object activities and sensor data;
performing an initial load of object recognition patterns, data and object state models and determining user or machine-learned customization of object and state models and actions and responses to be used at runtime;
receiving definition of relationships between one or more objects and state models used to trigger specific actions and responses and user customization or machine learned customization of the actions and responses; and during runtime, examining sensor data to determine detection of object(s) and state models and linking of detected objects and state models to pre-defined actions and responses, wherein the object has one or more modes of operation based on inanimate object component movement, further comprising detecting one of said modes of operation and renders audio or video corresponding to said detected mode of operation.

20. The method of claim 19, wherein objects on the platform and/or platform has geometrically corrected projection display content.

* * * * *